United States Patent [19]

Hu

[11] 4,025,482

[45] May 24, 1977

[54] CROSS-LINKED ETHYLENE MALEIC ANHYDRIDE INTERPOLYMERS

[75] Inventor: Shengen Hu, St. Louis, Mo.

[73] Assignee: Monsanto Company, St. Louis, Mo.

[22] Filed: Jan. 23, 1976

[21] Appl. No.: 651,865

Related U.S. Application Data

[62] Division of Ser. No. 494,447, Aug. 5, 1974, Pat. No. 3,951,926.

[52] U.S. Cl. .................. 260/29.6 T; 260/29.6 PM; 260/29.7 H; 260/29.7 T; 260/29.7 AT
[51] Int. Cl.² .................. C08F 8/44; C08F 267/04; C08J 3/04

[58] Field of Search ................ 260/29.7 H, 29.7 T, 260/29.7 AT, 29.6 T, 29.6 PM, 878 R; 526/261, 272

[56] References Cited

UNITED STATES PATENTS

| | | | |
|---|---|---|---|
| 2,923,692 | 2/1960 | Ackerman et al. | 260/17.4 |
| 3,073,805 | 11/1963 | Reinhard | 526/272 |
| 3,165,486 | 1/1965 | Johnson | 526/272 |

*Primary Examiner*—John Kight, III
*Attorney, Agent, or Firm*—William H. Duffey

[57] ABSTRACT

Ethylene-maleic anhydride interpolymers of improved hydrolytic and electrolytic stability are produced by cross-linking with about 0.35 to about 0.55 mol percent of triallyl isocyanurate based upon the maleic anhydride monomer.

2 Claims, No Drawings

CROSS-LINKED ETHYLENE MALEIC ANHYDRIDE INTERPOLYMERS

This is a division, of application Ser. No. 494,447, filed Aug. 5, 1974, now U.S. Pat. No. 3,951,926.

BACKGROUND OF THE INVENTION

1. Field of the Invention

The present invention relates to cross-linked interpolymers of ethylene and maleic anhydride. More specifically, it relates to ethylene-maleic anhydride interpolymers of improved hydrolytic and electrolytic stability which are cross-linked with a controlled amount of triallyl isocyanurate.

2. Description of the Prior Art

Numerous cross-linking agents have been considered for ethylene-maleic anhydride interpolymers. Vinyl esters have been widely used in recent years for this purpose. Another useful cross-linker is divinyl benzene.

Cross-linked interpolymers of ethylene and maleic anhydride find extensive use when dispersed in water as viscosity control agents. They act as bodying or thickening agents in the preparation of textile printing pastes, as stabilizers for detergents and as clay beneficiating agents useful in the preparation of drilling muds. Such interpolymers, generally in the form of gels, must be hydrolytically stable, however, so that their viscosity does not decrease upon standing or else they are useless in these particular applications.

Many known cross-linking agents are deficient because they result in interpolymers which are unstable products, i.e., products which have the serious disadvantage of being readily hydrolyzed in water, particularly in the presence of alkalies such as are usually present in the mixtures in which they are incorporated.

According to U.S. Pat. No. 3,073,805, such hydrolysis results in solution of the interpolymers upon standing with a steady breakdown in viscosity even to the extent that the final solution is about the equivalent of the unmodified copolymer. Examples of such ineffective cross-linking agents include, according to U.S. Pat. No. 3,073,805, vinyl allyl ether, triallyl cyanurate, triallyl isocyanurate, diallyl cyanamide, divinyl carbitol, divinyl sulfone, diallyl maleate and diallyl sebacate, among others. Thus, it was deemed surprising in U.S. Pat. No. 3,073,805 that diallyl ether as a cross-linker afforded production of interpolymers which were stable to hydrolysis.

U.S. Pat. No. 3,165,486 discloses that a number of bifunctional compounds which might be expected to be good cross-linking agents for ethylene and maleic anhydride copolymers, are not at all suitable for preparing interpolymers useful as thickeners for textile printing pastes. Several bifunctional compounds, including triallyl isocyanurate, proved ineffective according to the teachings of U.S. Pat. No. 3,165,486.

Thus, the prior art consistently taught that triallyl isocyanurate is unsuitable as a cross-linking agent for ethylene-maleic anhydride interpolymers intended for use as textile print paste thickeners.

Notwithstanding the improved results achieved with vinyl ester cross-linkers, there has remained a longstanding need for ethylene-maleic anhydride interpolymers having superior stability against electrolytic and hydrolytic degradation. It has been found, for example, that the shelf-life properties are deficient in some print paste concentrates containing vinyl ester cross-linked interpolymers. The problem is related to the rate of breakdown of the cross-linking agent, hence the resulting loss in viscosity of the ethylene-maleic anhydride interpolymer upon storage. Accordingly, the discovery of a cross-linker which affords superior stability of the interpolymer, especially in textile printing paste applications, would be an advancement in the art.

It is an object of the present invention, therefore, to provide ethylene-maleic anhydride interpolymers having superior hydrolytic and electrolytic stability.

Yet another object of the present invention is to provide cross-linked ethylene-maleic anhydride interpolymers which are superior thickeners for textile printing pastes.

Still another object of the present invention is to provide an improved method of cross-linking ethylene-maleic anhydride interpolymers.

These and other objects of this invention will be apparent from the following description.

SUMMARY

It has been discovered that ethylene-maleic anhydride interpolymers having superior hydrolytic and electrolytic stability can be prepared by incorporating controlled amounts of triallyl isocyanurate cross-linker. Specifically, the triallyl isocyanurate is employed in the range of about 0.35 to about 0.55 mol percent based upon the maleic anhydride present in the interpolymer. These results are entirely unexpected in view of the prior art teachings that triallyl isocyanurate is unsuitable as a cross-linker for ethylene-maleic anhydride interpolymers.

DESCRIPTION OF PREFERRED EMBODIMENTS

The interpolymers of this invention are formed by polymerizing a monomeric mixture of maleic anhydride and ethylene using triallyl isocyanurate as a cross-linking agent. Superior results are achieved when the triallyl isocyanurate is present in the range of about 0.35 to about 0.55 mol percent based on the maleic anhydride monomer.

Preferably, the interpolymer is produced using about a 4:1 or higher molar ratio of ethylene to maleic anhydride even though they react to from the interpolymer in substantially a 1:1 molar ratio; however, the interpolymer can be made using a larger or smaller molar ratio.

The polymerization can be carried out in an inert organic solvent, preferably a non-polymerizing hydrocarbon solvent having solvating action on both the monomers and the triallyl isocyanurate cross-linking agent but which has little appreciable solvent or swelling action on the cross-linked heteropolymer produced. In this way, the polymer is obtained in the form of a fine powder which only requires freeing from solvent before use. Suitable solvents include, for example, ethylene dichloride, ethyl acetate, dioxane and aromatic hydrocarbons such as benzene, toluene and xylene. The monomers and cross-linking agent are preferably dissolved in an amount of solvent such that the solids content of the reaction slurry formed is about 18 percent. This ordinarily represents an amount of solvent about six times the total weight of the compounds to be polymerized.

The amount of solvent is not critical, however, and proportions of solvent as much as 10 or 20 times the weight of the ethylene and maleic anhydride may be used. Alternatively, the triallyl isocyanurate cross-linking agent may be added to the mixture of maleic anhydride and ethylene during the course of the polymerization either over part or all of the polymerization period. The resulting solution is mixed thoroughly and heated sufficiently so that the polymerization reaction takes place.

An organic solvent-soluble catalyst is necessary. Any of the organic free-radical catalysts are satisfactory. Suitable catalysts include benzoyl peroxide, caprylyl peroxide, acetyl peroxide, acetyl benzoyl peroxide, di-tert-butyl peroxide, azoisobutyronitrile, dimethyl azoisobutyrate and many others. Mixtures of such catalysts are also suitable in the polymerization process of this invention. Radiation polymerization can also be used, e.g., such high-energy radiation sources as X-rays, gamma-rays, neutrons and the like can be used to initiate polymerization. The catalyst amount is not critical.

The polymerization can be carried out at a temperature within the range from 0° to 100° C. Preferred temperatures lie in the range from 40° to 80° C. with 55° to 65° C. being especially preferred. Pressures may vary from atmospheric to about 600 psig. Time varies from 2 minutes to 10 hours or more.

A less preferred method of forming the new cross-linked ethylene-maleic anhydride interpolymers is to add the cross-linking triallyl isocyanurate to the copolymer and carry out the cross-linking as a separate chemical reaction or polymerization step. At the completion of the polymerization reaction, the heteropolymer is recovered from the organic solvent by any suitable means. While the interpolymers may be used in anhydride form, they are more commonly employed as viscosity control agents in the form of their alkali metal or ammonium salts which form dilute swollen gels or dispersions in aqueous medium. This conversion is generally effected by solution in the appropriate aqueous hydroxide. Alkali metal or ammonium salts of the interpolymer such as sodium, potassium, lithium, rubidium and cesium salts may be obtained by reacting the interpolymers with the stoichiometric amount of the corresponding hydroxide. Partial salts may, of course, be produced by using less than the quantity of alkali required to effect complete conversion of the carboxyl groups. When polymeric anhydrides are dissolved using ammonia an appreciable amount of amide groups are formed resulting in mixed ammonium-amide polymeric salts.

For use as thickeners in textile printing pastes, the interpolymers should be substantially insoluble, i.e., they should not form a clear solution at 2% polymer concentration but rather a thixotropic gel in dimethylformamide at 25° C. Further, in order to obtain the maximum benefit of their thickening properties in textile printing pastes, the interpolymers should be in the form of alkali metal, ammonium, and/or amine salts. The salt can be used in aqueous dispersion in water in the range of about 0.1 to about 15% by weight, preferably 0.25 to about 10%.

Some types of coloring materials such as pigments or dyes used for printing cotton, rayon, nylon and other fabrics are already handled as high concentrations of the pigment dispersed in an inorganic solution of synthetic resin. They are applied by conventional means such as by rollers to the fabric in the form of a pigment-in-water emulsion. The emulsion is prepared by dispersing a petroleum solvent in an unpigmented resin solution called a "cut clear." The emulsion can be formed by mixing an aqueous dispersion of the salt of the present interpolymer with a petroleum solvent. It should be understood, however, that the present salts can be used as a print paste vehicle resin in a completely aqueous system without the petroleum solvents, particularly the higher cross-linked and/or higher molecular weight material. After application of the dye to the fabric, the fabric is dried and sometimes aged for color fastness. Aging and drying can be accomplished by steaming the fabric.

The cross-linked interpolymers or salts of the present invention are also useful as thickeners in fluids used in depleted oil wells to increase oil recovery by displacing oil from the oil sands. The novel interpolymers, the hydrolyzed products, and salts thereof can be additionally used in the formation of various mucilaginous or colloidal gel applications such as dentifrices, talc suspensions used in making dental impressions, bread dough, surgical jellies, creams and ointments, bulk laxatives, generally as thickeners for aqueous systems (e.g., latex paints), carrying agents, ion-exchange resins, and other materials for use in treatment of various disorders of the human and animal gastro-intestinal tract, etc. Also they can be used as suspending agents for flocculation treatment of ores for concentration or beneficiation, for mineral dressing, especially of iron, uranium, rare earth metals and molybdenum ores, etc. A further use is in industrial or sewage waste waters for coagulation to clean the water before discharging into a stream, e.g., paper mill waste water. Yet another use is to help suspend binds and improved uniformity of fibers in paper manufacture. For some of these uses the pH of the salt would be varied from substantially below 3 to substantially above 11, depending upon the particular properties desired.

Superiority of the ethylene-maleic anhydride interpolymers of the present invention is attributable to the controlled use of triallyl isocyanurate as a cross-linker. Triallyl isocyanurate can be prepared by at least three different process routes. According to U.S. Pat. No. 3,037,979, triallyl isocyanurate can be prepared by the successive alkylation and trimerization of an alkali cyanate in an inert solvent without the use of a catalyst. U.S. Pat. No. 3,075,979 describes the preparation of triallyl isocyanurate by alkylating cyanuric acid in a non-aqueous solvent with an allyl halide in the presence of a tertiary amine as acid scavenger. U.S. Pat. No. 3,065,231 describes yet another process which involves the conversion of cyanuric acid to the sodium salt and alkylation of the salt in the presence of a cupric chloride catalyst with excess allyl halide in an aqueous system above 40° C.

Typical physical properties of triallyl isocyanurate are as follows:

Appearance — Clear liquid
Molecular Weight — 249.26
Freezing Point, °C. — 23.5
Boiling Point, °C. — 150 at 4 mm Hg
Specific Gravity, 25°/25° C. — 1.157
Viscosity, cps, 25° C. — 110
Refractive Index, 25/D — 1.5113
Color, APHA — 35
Toxicity, $LD_{50}$ — 666 mg/kg
Solubility:
Water — 0.37 gm/100 gm water, 25° C.
Benzene — Completely miscible
Ethanol — Completely miscible
Acetone — Completely miscible
Heptane — Completely miscible Contrary to prior art teachings, e.g., U.S. Pat. Nos. 3,073,805 and 3,165,486, use of triallyl isocyanurate in controlled amounts is advantageous for ethylene-maleic anhydride interpolymers. To illustrate this surprising and unexpected result, comparative tests were conducted using as a reference a leading commercial ethylene-maleic anhydride interpolymer which had been cross-linked with a vinyl ester. The latter interpolymer is a product of Monsanto Company identified as "EMA 91."

Three samples were prepared of ethylene-maleic anhydride interpolymers cross-linked with triallyl isocyanurate, the cross-linker being present in about 0.39 mole percent based on the maleic anhydride monomer. Comparative data were obtained on product (gel) viscosity, hydrolytic stability and electrolytic stability.

A typical preparation of an ethylene-maleic anhydride interpolymer using triallyl isocyanurate as a cross-linker is illustrated in the following Example.

EXAMPLE I

A one-gallon autoclave fitted with a paddle stirrer and pressure control means served as the polymerization reactor. After it had been completely dried and freed of air, a mixture of 350 grams of maleic anhydride dissolved in 2,000 grams of 1,2-Dichloroethane was charged to the reactor and heated at 58° C. To this solution were added 8.4 grams of benzoyl peroxide and 3.5 grams of triallyl isocyanurate cross-linker. The reactor was then charged with sufficient ethylene to maintain a pressure at the reaction temperature (55° C.) of approximately 500 psig. (35.1 × 10$^4$ kilograms per square meter). The contents of the reactor were continually agitated throughout the entire reaction period.

The reaction was continued for 9 hours whereupon the reactor was automatically shut down with a timer. The slurry was filtered and the unreacted maleic anhydride in the filtrate was titrated with standard sodium hydroxide which indicated a conversion of greater than 98%. The wet cake was washed twice with 1,2-Dichloroethane to remove the residual maleic anhydride and was dried overnight at 60° C. and 20 inches of mercury gauge vacuum (6900 kilograms per square meter). The product was then gently pulverized with a blender.

A sample of the thus-formed interpolymer was added to sufficient water to make up a 0.7% by weight concentration of the interpolymer in water. Sufficient ammonium hydroxide was then added to neutralize the interpolymer and to form substantially the diammonium salt thereof. The viscosity of the resulting gel was determined with a Brookfield viscosimeter using a No. 4 spindle at 6 rpm and found to be approximately 215 poises at room temperature (about 25° C.).

Three separate batches of ethylene-maleic anhydride interpolymers of the present invention were prepared with triallyl isocyanurate as the cross-linking agent. The following Table I compares the important properties of the improved cross-linked interpolymers of this invention with the conventional interpolymers cross-linked with a vinyl ester. Sample Nos. 1, 2 and 3 were cross-linked with triallyl isocyanurate. Sample No. 4 was cross-linked with a vinyl ester and represented the reference or control standard. The hydrolytic stability of the respective samples was determined by aging cut clear samples at 50° C. for 1 week. Hydrolytic stability is expressed in Table I as a percentage of the original cut clear viscosity retained after aging.

When the cut clear is made into print paste by adding latex, pigment or other required components, there is invariably a substantial drop in viscosity. While the magnitude of the drop may be an indication of the electrolyte sensitivity of the thickener, the final print paste viscosity per se is the true measure of the electrolyte stability. Thus, the higher the final viscosity of the print paste, the higher the electrolytic stability of the thickener irrespective of the percent viscosity loss experienced by the cut clear when it is converted into the finished paste. Print paste viscosity results in Table I were obtained by using two commercially available, but proprietary formulations (one nonionic and the other anionic) to which the interpolymers of these examples were added.

TABLE I

| | EFFECT OF CROSS-LINKING AGENT | | | | | | |
|---|---|---|---|---|---|---|---|
| Sample No. | Cross-Linker | 0.7% Gel Viscosity (poises) | Cut Clear Viscosity (poises) | | Hydrolytic Stability | Print Paste Viscosity (poises) | |
| | | | Fresh | Aged | | Nonionic | Anionic |
| 1 | Triallyl Isocyanurate | 215 | 194 | 183 | 94.3 | 108 | 82 |
| 2 | Triallyl Isocyanurate | 215 | 189 | 187 | 98.9 | 94 | 70 |
| 3 | Triallyl Isocyanurate | 205 | 189 | — | — | 94 | 68 |
| 4 | Vinyl Ester | 229 | 169 | 66 | 39.1 | 68 | 46 |

The unexpected superiority of triallyl isocyanurate as a cross-linker is apparent from the above Table I. Superior results are achieved, however, only when the triallyl isocyanurate is employed within a critical concentration range. This range is from about 0.35 to about 0.55 mol percent based upon the maleic anhydride monomer. It has been found that the interpolymer does not have high thickening power below the optimum cross-linking range. Above the optimum range the interpolymer becomes too sensitive toward extraneous ions in print paste formulations.

To illustrate the criticality of the quantity of triallyl isocyanurate cross-linker which must be employed if superior results are to be achieved, several interpolymer samples were prepared having different amounts of triallyl isocyanurate cross-linker as described in Example II.

EXAMPLE II

Six ethylene-maleic anhydride interpolymers were prepared using triallyl isocyanurate as the cross-linking agent. In the respective samples the presence of triallyl isocyanurate varied from 0.4 to 0.8 mol percent based upon the maleic anhydride monomer. The interpolymers were prepared according to the exact procedure of Example I except for the variations in the triallyl isocyanurate quantity. The control sample was the same as in Example I wherein the cross-linker was a vinyl ester. Criticality in the amount of triallyl isocyanurate cross-linker is readily apparent from Table II below by observing the magnitude of loss in cut clear viscosity resulting from the introduction of 15 percent by weight latex. Thus, when the triallyl isocyanurate mol percent was raised to 0.6 and 0.8, the final cut clear viscosities fell into the range of 33000 to 47000 centipoises which were unsuitably lower than that of the control interpolymer which was cross-linked with a vinyl ester.

TABLE II

EFFECT OF CROSS-LINKER CONCENTRATION

| Sample No. | Cross-Linker | Cross-Linker Concent.- (mol %) | Cut Clear Viscosity (1,000 centipoises) | | |
|---|---|---|---|---|---|
| | | | 0% | 15% Latex | % Loss |
| 5 | Triallyl Isocyanurate | 0.4 | 92 | 56 | 39 |
| 6 | " | 0.4 | 119 | 62 | 48 |
| 7 | " | 0.6 | 130 | 47 | 64 |
| 8 | " | 0.6 | 101 | 37 | 64 |
| 9 | " | 0.8 | 103 | 33 | 71 |
| 10 | " | 0.5 | 138 | 58 | 58 |
| 11 | Vinyl Ester | — | 136 | 60 | 56 |

While this invention has been described with respect to specific examples and embodiments, it is to be understood that the invention is not limited thereto and that it can be variously practiced within the scope of the following claims.

The embodiments of this invention in which an exclusive property or privilege is claimed are defined as follows:

1. A composition useful as a thickener for textile printing pastes which comprises an aqueous dispersion of from about 0.1 percent to about 15 percent by weight of a salt selected from the group consisting of alkali metal, ammonium and amine salts of a cross-linked interpolymer of substantially equimolar portions of maleic anhydride and ethylene and from about 0.35 to about 0.55 mol percent of triallyl isocyanurate based upon the maleic anhydride monomer.

2. A composition of claim 1 wherein the salt is present in about 0.25 to about 10 percent by weight.

* * * * *